United States Patent
Larsen et al.

[11] Patent Number: 5,877,494
[45] Date of Patent: Mar. 2, 1999

[54] BEAM ERROR CORRECTION USING MOVABLE CORRECTION ELEMENT

[75] Inventors: David B. Larsen, Woburn; Laurence S. Blake, Peabody; Norman Rolfe, Carlisle; Henry A. Kelley, Woburn, all of Mass.; Frank Scholten, Livingston, N.J.

[73] Assignee: Agfa Division, Bayer Corporation, Wilmington, Mass.

[21] Appl. No.: 687,931

[22] Filed: Jul. 29, 1996

[51] Int. Cl.[6] ........................................... H01J 3/14
[52] U.S. Cl. ................. 250/234; 250/559.06; 359/210
[58] Field of Search .................. 250/234–236, 250/559.06, 201.2–201.5; 359/210–214, 554–557

[56] References Cited

U.S. PATENT DOCUMENTS

| | | | |
|---|---|---|---|
| 4,782,474 | 11/1988 | Arai et al. | 250/201.4 |
| 4,969,137 | 11/1990 | Sugiyama et al. | 250/201.5 |
| 5,097,351 | 3/1992 | Kramer | 359/214 |
| 5,179,463 | 1/1993 | Kramer | 359/210 |
| 5,214,528 | 5/1993 | Akanabe et al. | 359/211 |
| 5,253,245 | 10/1993 | Rabedeau | 359/210 |
| 5,309,274 | 5/1994 | Akanabe | 359/210 |

FOREIGN PATENT DOCUMENTS

| | | |
|---|---|---|
| 475 399 | 3/1992 | European Pat. Off. . |
| 557 998 | 9/1993 | European Pat. Off. . |
| 632 434 | 2/1995 | European Pat. Off. . |

*Primary Examiner*—Que Le

[57] ABSTRACT

A scanning system for scanning an imaging surface includes a radiation emitter configured to emit a beam of radiation directed towards a deflector for scanning the beam onto the imaging surface. A detector detects any misalignment of the beam with respect to the deflector. A driver moves a correction element substantially perpendicular to the beam axis of the correction element to correct for the detected misalignment during scanning of the imaging surface.

57 Claims, 8 Drawing Sheets

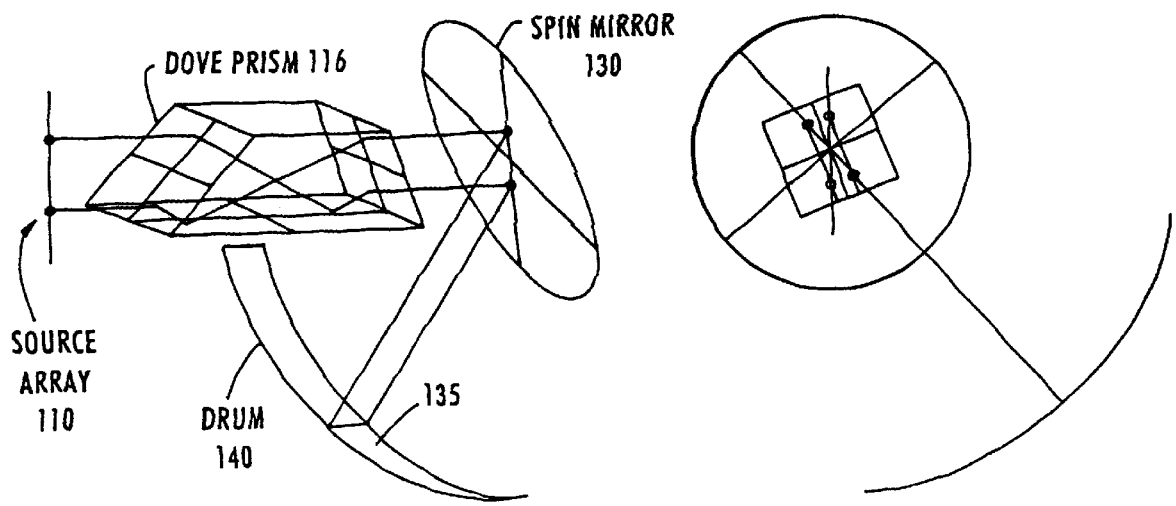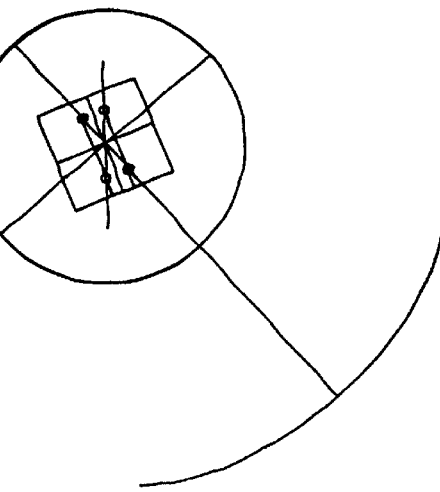
Figure 1A
PRIOR ART
Figure 1B
PRIOR ART
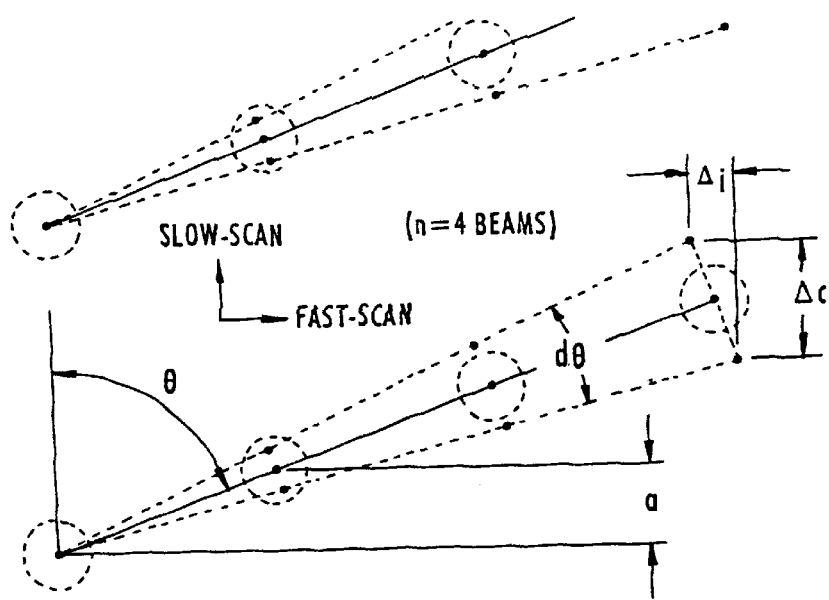
Figure 1C
PRIOR ART

BEAM ERROR CORRECTION USING MOVABLE CORRECTION ELEMENT

RELATED APPLICATIONS

This application relates to U.S. patent application. Ser. No. 08/687,928, filed Jul. 29, 1996, for BEAM ALIGNMENT CORRECTION ELEMENT ASSEMBLY; U.S. patent application. Ser. No. 08/706,339, filed Aug. 30, 1996 for MULTI-BEAM SCANNER WITH MECHANICALLY MOVING ELEMENT FOR SCANNING IMAGING SURFACES, now U.S. Pat. No. 5,864,418; and U.S. patent application. Ser. No. 08/706,338, Aug. 30. 1996, for MULTIBEAM SCANNER WITH A COUSTO-OPTIC ELEMENT FOR SCANNING IMAGING SURFACES, now U.S. Pat. No. 5,796,551.

1. Technical Field

The present invention relates to beam scanning systems and more particularly to systems useful in scanning internal drum imaging surfaces such as those utilized in electronic prepress operations.

2. Background Art

Modern electronic prepress operations utilize laser scanning systems to write or record images for subsequent reproduction or to scan a prerecorded image at a predefined resolution rate. Such scanning systems may write or record images or scan prerecorded images on various prepress media including, photo or thermal sensitive paper or polymer films, photo or thermal sensitive coatings or erasable imaging materials mounted onto an image recording surface or photo or thermal sensitive paper, polymer film or aluminum base printing plate materials, all used in electronic image reproduction. Such media are mounted onto a recording surface which may be planar but which is more typically curved and scanned with a recording or scanning beam. The primary components of such a system include a recording surface, usually a drum cylinder and a scan mechanism disposed and movable within the drum cylinder. The system also includes a processor, with an associated storage device, for controlling the scanning mechanism and for scanning a prerecorded image, a photodetector and detector processor. The processor and associated storage device may be housed within the system itself or separate from the system with appropriate interconnection to the system.

The processor, in accordance with stored programming instructions, controls the scanning mechanism to write or read images on the plate or other medium mounted to the inner drum cylinder wall by scanning one or more optical beams over the inside circumference of the drum cylinder while the drum cylinder itself remains fixed.

The scanning and hence the recording are performed over only a portion of the cylinder inner circumference, typically between 120° and 320° of the circumference of the drum cylinder. The optical beam(s) are typically emitted so as to be parallel with a central axis of the cylinder and are deflected, by for example, a spinning mirror, Hologon or Penta-prism deflector so as to form a single scan line or multiple scan lines which simultaneously impinge upon the recording surface. The deflector is spun or rotated by a motor about an axis of rotation substantially coincident with the central axis of the drum cylinder. To increase the recording speed, the speed of rotation of the beam deflecting device can be increased. To even further increase the recording speed, multiple beam scanning has been previously proposed.

One such proposed multiple beam scanner has utilized a spinning dove prism with a single light source, as discussed, for example, in U.S. Pat. No. 5,214,528. Using a dove prism beneficially allows the use of a multiple beam source, e.g. a laser diode array, while eliminating the need for multiple beam correction elements and associated hardware. Additionally, for reasons which need not be discussed here, the scan speed of multiple beam systems using a dove prism can exceed that of other types of proposed multi-beam systems.

As shown in FIG. 1A, a dove prism 116 is disposed in the optical path between a laser source array 110 and the spin mirror 130. The prism 116 rotates about an axis coincident with the longitudinal axis of the drum cylinder 140 (or an optical axis which becomes coincident) at half the speed of the spin mirror 130 to scan the image surface 135 of the drum 140. Since the spinning of dove prism 116 produces a 2X axial rotation of all light beams passing through the prism, the multiple beams leaving the prism will rotate in lockstep with the rotation of the spin mirror 130, as shown by the rays marked with filled circles in FIG. 1B. Accordingly, by passing the multiple light beams through a spinning dove prism, crossing of the multiple scan lines formed by the spin mirror is avoided.

Notwithstanding the type of scanning element being utilized, it is of primary importance that the light beam(s) contact the deflector as close as possible to a desired location to ensure that the appropriate scan line(s) are formed on the recording surface and hence the desired image is properly recorded. In the case of a multiple beam system, this includes maintaining the desired spacing or overlapping relationship of the simultaneously scanned beams with respect to each other and the reduction or elimination of any differential scan line bow between successive scan lines.

Further, if a light beam is rotated by a rotating dove prism, the beam's rotation and hence the rotation of the prism must be synchronized with the angular position of the rotating deflector to obtain a proper scan of the recording surface and thereby properly record the desired image. Small changes in the phase locking of the two motors, i.e. the prism and deflector motors, can create banding groups, particularly for commonly used laser array geometries.

A wobble in the spinning dove prism motor or other types of anomalies will cause a misalignment of the dove prism and can create significant banding artifacts which repeat every two scan passes of the deflector. If such a misalignment exists in multiple beam systems of the dove prism type as have been proposed, the system is restricted to recording during only every other rotation of the spin mirror to obtain high quality results. A four beam system is accordingly only two times faster than single beam system, an eight beam system only four times faster, and so on.

The effect of dove prism wobble on system banding can be reduced by a ratio of the beam diameter at the prism to the beam diameter at the spin mirror, e.g. at least a 20X–30X reduction is obtainable for prism beam diameters of ~1 mm or less. Hence, by increasing the ratio, the contribution of prism wobble to system banding can be reduced significantly. Angular alignment sensitivities for scan line bow are improved by the same ratios. A small beam diameter in the prism also reduces the size of the required prism and prism motor.

However, repeatable wobble of the prism can also create a twinning between groups of the multiple beams because the prism rotates only half a turn for each full turn of the spin mirror. Twinning may also result from small alignment errors between the prism and its motor shaft. If the twinning error from the combination of these two causes is excessive the system will be restricted to recording only every other rotation of the spin mirror to obtain high quality recording.

Currently available laser diode arrays have much larger source separation distances than source sizes. Such arrays usually require that the line of sources be tilted closer to 90° than 0° to the slow-scan direction to obtain acceptable overlap of the multiple beams, data delays are then required to synchronize the fast-scan pixel positions.

If the multiple beams leaving the dove prism drift or flutter relative to the spin mirror, due, for example, to small motor speed variations, the cross-scan spacing between the multiple scan lines will change and this also can create banding. The largest effect is on the spacing between the last scan line of one pass of the multiple beams and the first scan line of the next pass of the multiple beams.

As shown in FIG. 1C, the worst case spacing error $\Delta_c$, as a fraction of the nominal cross-scan line spacing, is equal to the product of: the number of beams minus one, twice the sine of one-half the total band drift/flutter angle, and the tangent of the tilt angle required for proper overlap and is computed as follows:

$$\Delta_c/\alpha = (n-1)[2\sin(d\theta/2)][\tan(\theta)] \quad (1)$$

when $\{|\sin(d\theta/2)| \leq |\sin(\theta)|\}$

The worst case in-scan jitter $\Delta_j/\alpha$ as a fraction of the nominal cross-scan line spacing is similarly affected by an angular drift or flutter between the motors, in this case with no dependence on the tilt angle, and is computed as follows:

$$\Delta_j/\alpha = (n-1)[2\sin(d\theta/2)] \quad (2)$$

when $\{|\sin(d\theta/2)| \leq |\cos(\theta)|\}$

Jitter is most important for source arrays of optical systems with tilt angles closer to 0°, where the cross-scan banding effect is small. Hence, banding, twinning and jitter caused by misalignment of the dove prism or synchronization errors between the dove prism and deflector rotation can significantly reduce the advantages which are otherwise obtainable from multibeam, dove prism type scanning systems.

U.S. Pat. No. 5,097,351 proposes a multibeam system which utilizes a controlled movable reflector in lieu of a dove prism and requires each of two laser beams to follow a separate optical path, each having separate focusing and collimating lenses and acousto-optical modulator (AOM). The controlled reflector is disposed in only one of the optical paths and is driven to rotate one beam in sync with the rotation of the spin deflector. Errors are detected, and corrected by driving the deflector to adjust angular alignment during recording operations. However, the complexity of the system makes implementation difficult, if not impractical.

OBJECTIVES OF THE INVENTION

Accordingly, a need remains for a simplified system to correct banding or twinning resulting from misalignment of the dove prism to thereby improve multibeam image recording. It would also be advantageous if all beams of a multi-beam system could travel along a single optical path and be acted upon by a single correction device to simultaneously correct positioning errors, including those caused by wobble in the dove prism spin shaft, etc., in all the beams. It would also be beneficial if errors could be detected without requiring that a portion of the scanning beam(s) be used during recording operations to detect beam positioning errors.

Additional objects, advantages, novel features of the present invention will become apparent to those skilled in the art from this disclosure, including the following detailed description, as well as by practice of the invention. While the invention is described below with reference to preferred embodiments for electronic prepress applications, it should be understood that the invention is not limited thereto. Those of ordinary skill in the art having access to the teachings herein will recognize additional applications, modifications, and embodiments in other fields, which are within the scope of the invention as disclosed and claimed herein and with respect to which the invention could be of significant utility.

SUMMARY OF THE INVENTION

In accordance with the present invention, a scanning system and technique are provided which are particularly suitable for implementation in high quality graphic arts image setters, platemakers or scanners. The scanning system includes at least one laser or other type of radiation emitter or emitter array which emits one or more beams directed towards a deflector configured to deflect and scan the beam or beams onto an imaging surface to record or write or scan the image. The system includes a detector, having for example a charge couple device (CCD), photodetector, or other suitable detecting device, to detect the misalignment of the beam or beams with respect to the deflector or other reference position. The detector could, for example, be a quadrature photodetector or any other device which is suitable for detecting a misalignment of one or more emitted beams with respect to the deflector.

In a typical application at least one of the emitted beams will beneficially impinge upon a spinning deflector approximately coincident with the spin axis of the deflector. Accordingly, the detector may beneficially detect any misalignment of the beam with respect to the deflector spin axis. The deflector may be a spinning mirror, Hologon, Pentaprism or other element which is suitable for deflecting and scanning a beam on the imaging surface. To correct for any detected misalignment, a correction element, such as a lens, is located between the one or more emitters and the image surface. The correction-element is driven by, for example, electrical coils, piezo-electric elements or other drive devices to move during the scanning of the imaging surface to correct the detected misalignment.

The correction element is beneficially simultaneously driven in at least one direction perpendicular to its emission axis, e.g. the optical axis of a correction lens. This allows the correction element to be driven such that its optic or beam axis moves in a cyclic fashion about an axis coincident with the optical or beam axis of the element prior to its movement, i.e. the optical or beam axis of the element when in a stationary position prior to being subjected to drive forces. This is particularly advantageous in a multibeam system which, for example, includes a spinning dove prism or other spinning element to avoid cross-over on the imaging surface of the scanning beams formed by the spinning deflector.

In a multi-beam system having a spin element such as a spinning dove prism, misalignments due to geometric alignment errors between the spin element and its spin shaft, as well as misalignments resulting from wobble in the spin shaft, can be corrected in accordance with the present invention by moving the correction element in synchronization with the spinning of the spin element.

The actual detection of the misalignment may be performed prior to scanning the beam(s) to record on the imaging surface. For example, scanning may be performed over a portion of a cylindrical drum not used for recording or writing prior to scanning the recording surface since the recording surface will typically cover less than the full circumference of the cylindrical drum of an image setting device. Alternatively, the detection may be performed prior to mounting an imaging medium within the cylindrical drum of the scanning system. Accordingly, the detection is performed off-line, that is prior to the writing or recording being performed on the imaging surface.

If detection is performed prior to actual writing on the imaging surface, it may be beneficial in certain implementations to also drive the correction element prior to actual writing operations to correct for the detected misalignment and to encode the movement of the correction element during this pre-writing period. In this regard reticules may be beneficially attached to the lens housing and the housing support structure to provide a means for detecting and encoding the actual movement of the correction element to correct for the detected misalignment. The encoded movement can then be stored and subsequently utilized to drive the correction element during actual writing or recording operations to correct for the previously detected misalignment of the beam(s) and the deflector.

In accordance with further aspects of the invention a reference radiation emitter may be included in the system to emit a reference beam which has a frequency different from the frequency of the writing beam or beams. All beams are passed through the correction element. The reference beam is then directed to the detector to detect any misalignment in the recording beam(s) which are directed to the deflector.

If a reference beam is included in the system, the writing beam(s) and the reference beam may beneficially be cogenerated or combined in a beam combiner upstream of the correction element. Accordingly, the correction element will modify the direction of both the writing beam(s) and the reference beam simultaneously such that the alignment of the writing beam(s) and the reference beam are corrected. Thus, the reference beam can be utilized independent of the writing beam(s) to detect and correct any misalignment of the writing beam(s) with respect to the deflector. A splitter may be disposed downstream of the correction element to split the combined beam which is then filtered in a path leading to the deflector to filter out the reference beam and in a path leading to the detector to filter out the writing beam(s). Hence, only the writing beam(s) impinge upon and are deflected by the deflector and only the reference beam is received and imaged by the detector.

In those implementations having a spin deflector, such as a spinning mirror, and a spin element, such as a spinning dove prism, if the spinning of the respective elements are not synchronized, banding or jitter artifacts may result which degrade the quality of the scan on the imaging surface. In accordance with other aspects of the invention, such synchronization errors are corrected by either tilting the radiation source array(s) of the emitter(s) or controlling the emission timing of radiation from respective pixels within the source array(s).

BRIEF DESCRIPTION OF THE DRAWINGS

FIG. 1A depicts a multibeam scanning system without misalignment and synchronization error correction.

FIG. 1B depicts the rotation of the beams in relation to the rotating spin mirror in the FIG. 1A system.

FIG. 1C depicts scan lines spacing anomalies caused by a lack of synchronization between the rotating dove prism and spin mirror depicted in FIG. 1A.

DESCRIPTION OF PREFERRED EMBODIMENT

Figure 2:
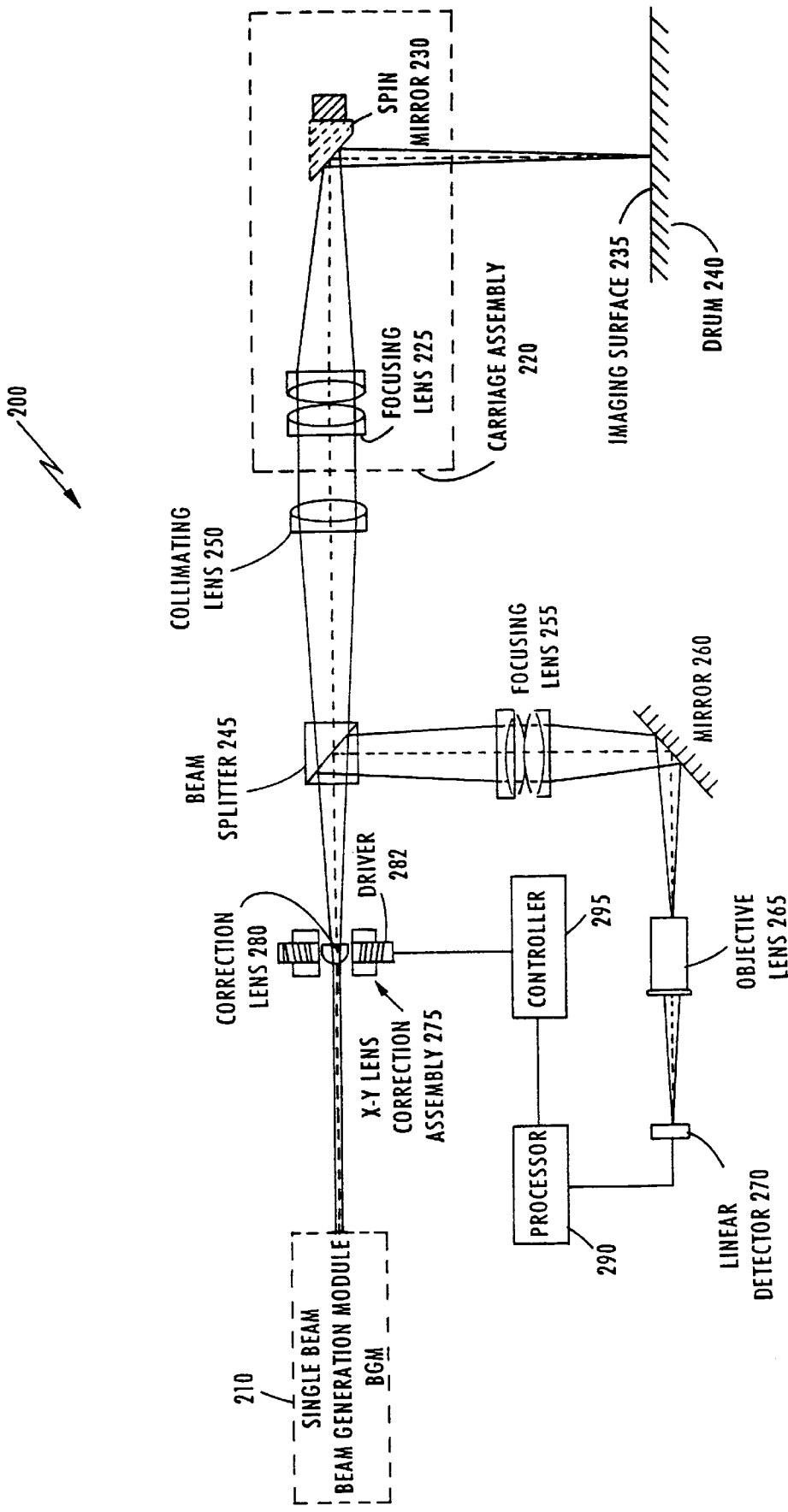
FIG. 2 depicts a first embodiment of a beam scanning system with a movable error correction element in accordance with the present invention.

FIG. 2 depicts a scan system 200 in accordance with the first embodiment of the present invention. The scan assembly includes a single beam generation module (BGM) 210, having a laser light source for emitting a light beam directed towards the carriage assembly 220, which includes focussing lens assembly 225 and spin mirror 230. The light beam is deflected by the spin mirror 230 onto the imaging surface 235 disposed on the inside of cylindrical drum 240. The assembly includes a polarization sensitive beam splitter 245, which could be a multi-layer dielectric coated mirror or a grating element, to direct a portion of the laser light beam to the collimating lens 250 and another portion of the laser light beam to the focusing lens 255. The later beam is deflected by mirror 260 through the objective lens 265 e.g., a microscopic lens, and onto a quadrature photodetector 270. The system 200 further includes an X-Y lens correction assembly 275 through which the emitted laser light beam passes before entering the beam splitter 245.

The lens correction assembly 275 includes a correction lens 280 which is movable in a plane substantially perpendicular to the optical axis of the lens when stationary and hence to the direction of the laser light beam emitted by the BGM 210. In this particular implementation to properly scan the imaging surface 235 of the cylindrical drum 240 the laser light beam emitted from the BGM 210 is directed to the axis of rotation of the spin mirror 230. Any misalignment of the BGM 210 with respect to the spin mirror 230 will degrade the scan on the imaging surface 235. In accordance with the present invention, any such misalignment of the BGM 210 is compensated by the lens correction assembly 275.

More particularly, beam positioning errors in system 200 may occur due to mechanical tolerances which are difficult to eliminate through mechanical adjustments. For example, the mounting alignment of the BGM 210 may have a slight error. These positional errors can cause a misalignment of the emitted light beam with respect to the spinning mirror 230. To correct for these errors the light beam emitted by BGM 210 is passed through the lens correction assembly 275 prior to the beam being split by the beam splitter 245. The lens correction assembly is driven to move the lens and deflect the light beam passing therethrough during imaging such that the light beam which continues from the beam splitter 245 to the spin mirror 230 impinges upon the spin mirror at a desired location. The point of impingement is preferably located relative to the axis of rotation of the spin mirror and may, if desired, be coincident thereto. The lens 280 is mounted so as to have an optical axis which is nominally coincident with the propagation axis of the beams and is movable in at least one direction perpendicular to its original optical axis.

In operation, the light beam used to detect beam misalignment is directed by the mirror 260 onto the linear photo detector 270 and serves as a reference beam. The detector senses the position of this light beam with respect to a reference position as is well understood in the art. The detector output is fed through a decoder (not shown) and the decoded signals are input to a processor 290 which identifies any discrepancies between the detected position of the reference light beam and the reference position. The processor then generates correction signals corresponding to the discrepancy or misalignment. These signals are transmitted to the drive controller 295. The drive controller then issues to the driver 282 of the lens correction assembly 275, electrical signals proportional to the reference laser beam position at the detector to drive the movement of the lens 280 to correct the positioning of the reference light beam and thereby also correct the position of the writing light beam which is reflected off the spin mirror 230 onto the imaging surface 235.

Figure 4:
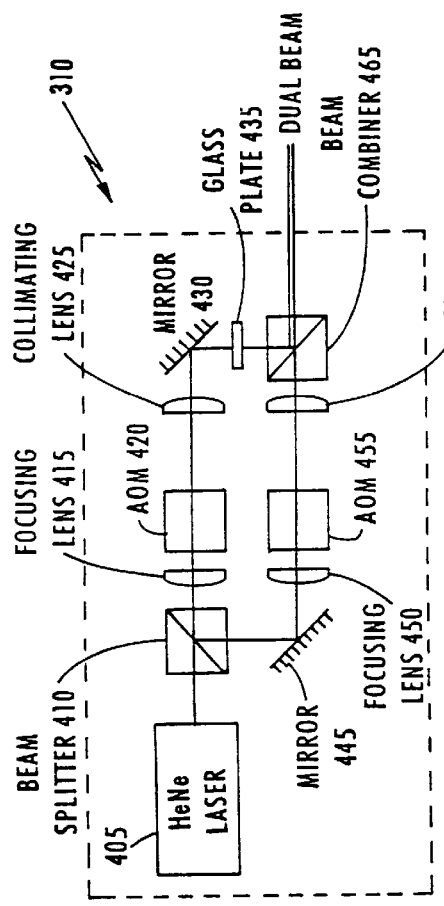
FIG. 4 depicts a dual beam generation module (BGM) suitable for use in the FIG. 3 embodiment.
Figure 3:
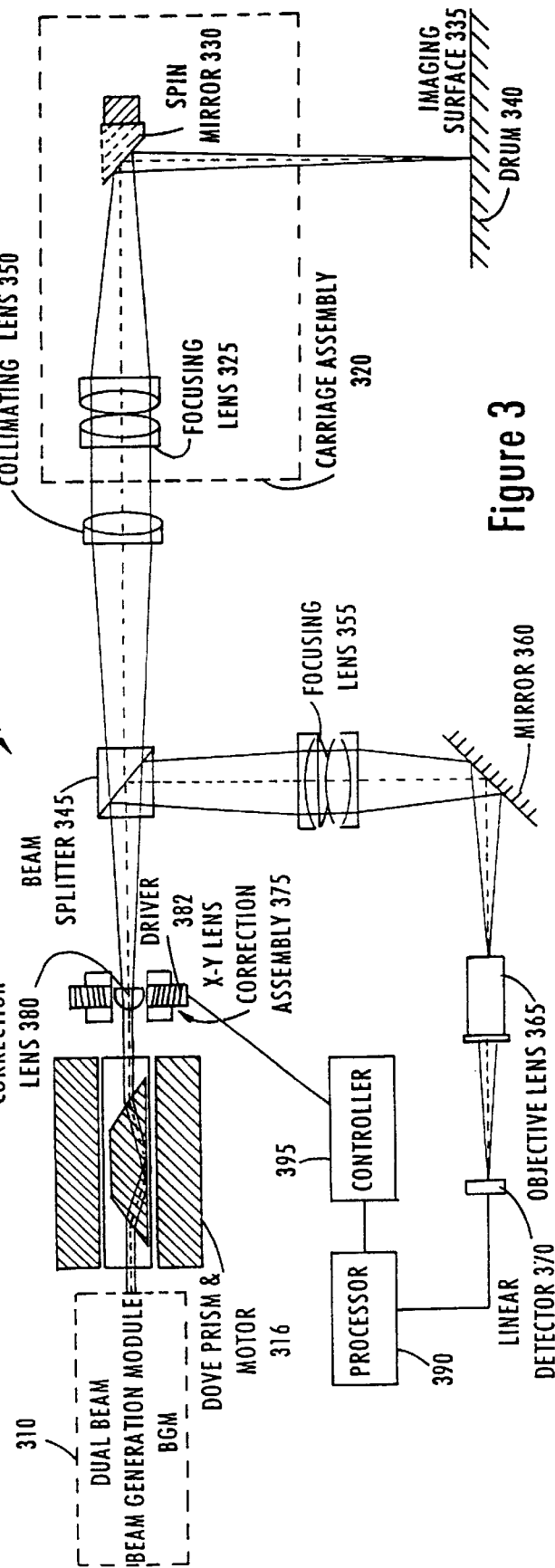
FIG. 3 depicts a second embodiment of a beam scanning system with a movable error correction element in accordance with the present invention.

FIG. 3 depicts a dual beam scanning system 300 which includes a dual beam generation module (BGM) 310. BGM 310, as shown in FIG. 4, includes a laser 405 which emits a light beam to the beam splitter 410. The beam splitter 410 directs a first beam through a focussing lens 415 to acoustooptic modulator (AOM) 420. The modulated beam is then directed via a collimating lens 425 to impinge upon mirror 430. The beam is directed by the mirror 430 through a glass plate 435 to beam combiner 440 which is substantially identical to beam splitter 410 but operates in reverse. A second beam is reflected by mirror 445 through focussing lens 450 to AOM 455 where it is independently modulated. From the AOM 455, the beam passes through collimating lens 460 to beam combiner 440 which combines the beams.

Returning to FIG. 3, the combined beams are passed through a rotating dove prism 316. A first of the two beams is propagated nominally along the longitudinal axis of the drum 340 for writing on the imaging surface 335. The spin axis of spin mirror 330 is also substantially coincident with the longitudinal axis of the drum 340. A second beam is propagated by the rotating dove prism 316 along a path which is nominally parallel to the longitudinal axis of the drum 340. The dove prism is spun at a rotational frequency which is advantageously one-half the rotational speed of the spin mirror 330 in order to avoid crossing of the scanned beams on the imaging surface 235.

The beams are directed by the rotating dove prism 316 through the lens correction assembly 375 and to the beam splitter 345. In the FIG. 3 system, even if the BGM 310 is perfectly aligned such that the beam is precisely directed along the longitudinal axis of the drum 340, wobble and mounting errors in the dove prism 316 may induce alignment errors in the beams. These errors will occur every 1800 of rotation if due to mounting errors and every 3600 of rotation if due to wobble in the prism's spin shaft.

In the FIG. 3 system, the laser light source is linearly polarized with its plane of polarization angularly rotated at 45° to the plane containing the optical components. Due to this angular orientation, the laser output power is equally divided into two orthogonally polarized beam components for each of the dual laser light beams. The beam splitter 345 is polarization sensitive and accordingly separates the respectively polarized components of each beam, directing a first component towards the spin mirror 330 and a second component through focussing lens 355 and on to mirror 360. Mirror 360 directs the beam through the objective lens 365 and onto the quad detector 370 which functions to detect the position of at least one of the beams with respect to a reference position as will be well understood by those skilled in the art. The detector output is decoded and processed in processor 390 which issues correction signals to the lens correction assembly controller 395. In response, controller 395 controls the issuance of electrical signals proportional to the reference beam position at the detector 370 to cause the drive mechanism 382 to drive the lens 380 to correct the misalignment errors. The processor 390 and controller 395 direct the movement of the lens 380 in a manner similar to that described in connection with FIG. 2 above. Accordingly, the components of the dual light beams which are passed to the spin mirror 330 via the collimating lens 350 and focussing lens 325 are correctly positioned and therefore can be deflected by the spin mirror to form the desired scan on the imaging surface 335.

Figure 5:
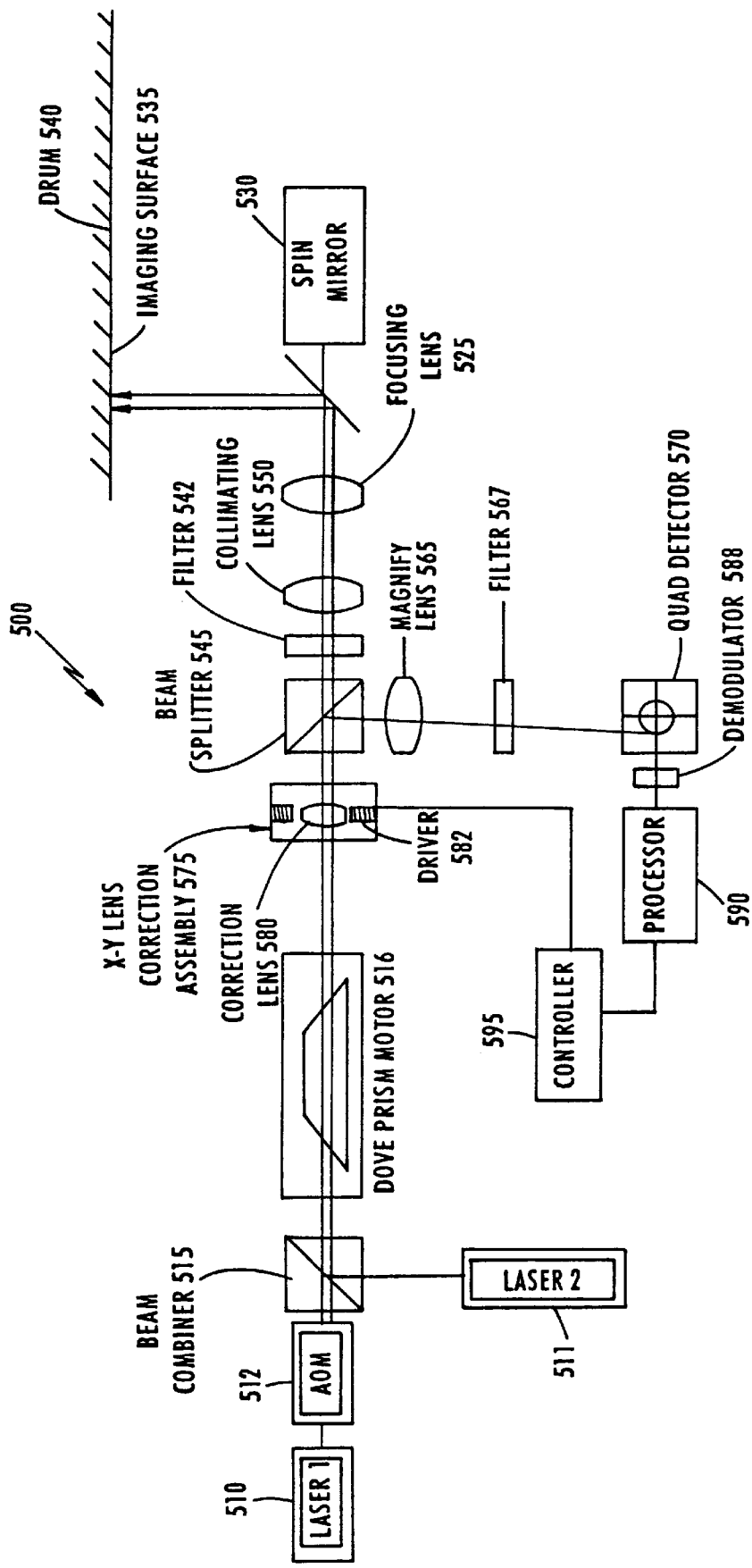
FIG. 5 depicts a third embodiment of a beam scanning system with a movable error correction element in accordance with the present invention.

Referring now to FIG. 5, a laser scanning system 500 is depicted. The system is similar to that described in connection with FIG. 3 with the exception that two emitters, which emit light beams respectively modulated at different frequencies or emitted so as to have different wavelengths, are utilized to form the writing and the reference beams.

As depicted in FIG. 5, a laser 510 which is a dual beam BGM similar to BGM 310 of FIG. 4, emits writing light beams which are modulated in AOM 512 prior to entering the beam combiner 515. A second laser 511 emits a reference light beam directed to the beam combiner 515, which combines the writing and reference beams in a conventional fashion. The combined beams are directed to the rotating dove prism 516 which rotates in a manner similar to the dove prism 316 described above in FIG. 3. The combined beams are then directed through the lens correction assembly 575 and to beam splitter 545.

Beam splitter 545 splits the combined beam, which is directed along a first path towards the spin mirror 530 and along a second path towards the quad detector 570. The beam directed along the second path is magnified in the lens 565 and filtered in filter 567 to filter out the writing beams. Accordingly, only the reference beam from laser 511 is detected by the quad detector 570. Here again, the quad detector senses the position of the reference laser beam with respect to a reference position and issues an output signal to processor 590. The processor 590 processes the received signals to determine the error in the reference beam position and generates a correction signal which is transmitted to the lens correction assembly controller 595. Responsive to the signals from processor 590, the controller 595 directs electrical signals proportional to the reference laser beam position at the detector 570 to the lens correction assembly driver 582. The driver 582 drives the movement of the lens 580 to correct the misalignment in the beams emitted from the rotating dove prism 516. The beam emitted from the beam splitter 545 on the path to the spin mirror 530 is filtered in filter 547 to remove the reference beam. The writing beams are then directed through the collimating lens 550 and focusing lens 525 onto spin mirror 530. The writing beams are deflected by the spin mirror 530 to scan the imaging surface 535 of the medium mounted to the drum 540.

Accordingly, both the writing and reference beams are corrected simultaneously by the lens correction assembly 575. The second laser could, if desired, be an infrared laser which would emit light beams which could be filtered from the writing beams by optical filter 542 or to which the record media is insensitive. Filtering the writing beams from the reference beam may be more difficult. Therefore, modulation and demodulation could be beneficially utilized to increase the signal to noise ratio of the signals emitted from the quad detector 570. Hence, system 500 beneficially includes demodulator 588 disposed between the quad detector 570 and the processor 590. It will be recognized that the operation of the scanning systems depicted in FIGS. 2–5 provide real-time misalignment detection and real time correction of the writing beams.

Figure 6:
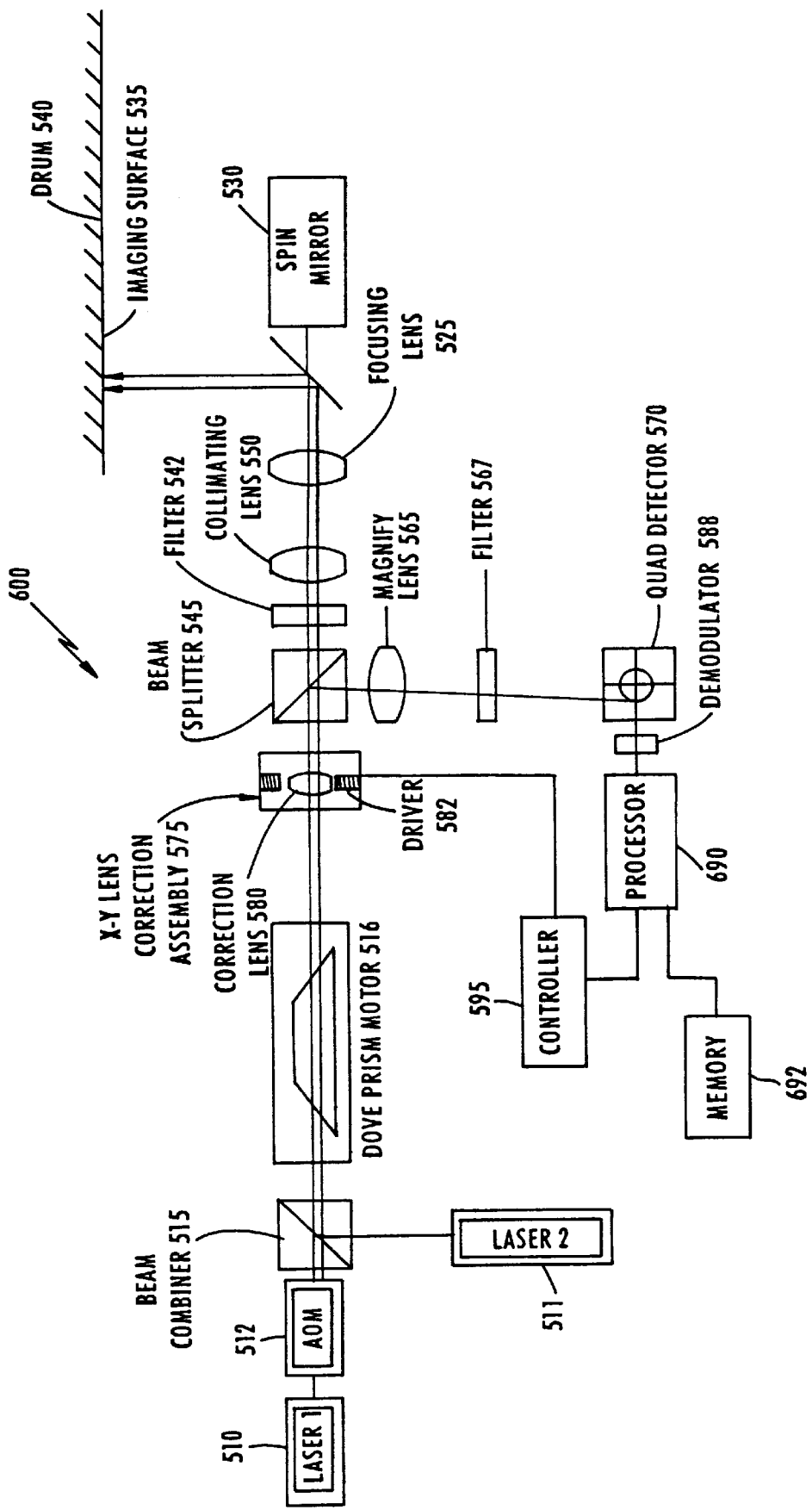
FIG. 6 depicts a fourth embodiment of a beam scanning system with a movable error correction element in accordance with the present invention.

FIG. 6 depicts another scanning system 600 which also utilizes a lens correction assembly 580 to correct misalignment of the writing beams. Scanning system 600 is similar to the scanning system of FIG. 5, however, in the FIG. 6 system the misalignment is detected off line, i.e., not during writing operations. Accordingly, a memory 692 is provided to store data corresponding to misalignment detected during sampling performed prior to writing operations. During writing operations, the stored data is utilized by the processor 690 to issue signals synchronized with the rotation of the dove prism 516 to the controller 595 so that the correction lens 580 is driven to cancel out the misalignment errors.

Because the imaging surface 535 will not typically extend over the entire inner circumference of the cylindrical drum 540, the sampling can be performed during a period in which the writing beams scan that portion of the inner circumference of the cylindrical drum 540 over which writing is not performed. Alternatively, sampling could be performed prior to mounting an imaging medium on the inner circumference of the cylindrical drum 540 or prior to bringing the carriage over the imaging surface.

The stored data is beneficially for one revolution of the dove prism which, as discussed above, corresponds to two revolutions of the spinning mirror. The correction signals are then repeated over and over throughout the writing operation. Since misalignment detection is not performed in real time, system 600 is beneficially utilized only if the alignment drift during writing operations is insignificant.

Figure 7:
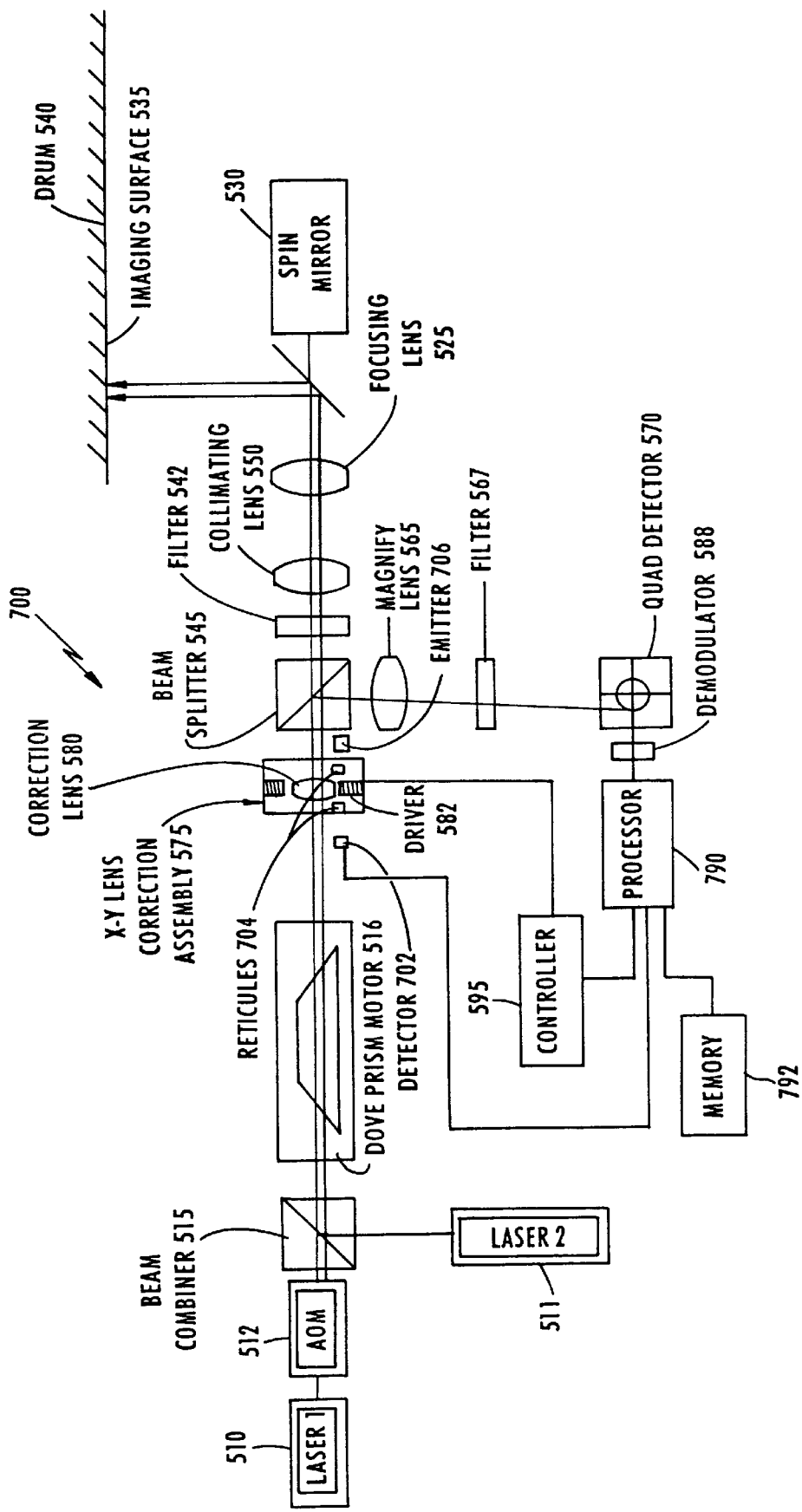
FIG. 7 depicts a fifth embodiment of a beam scanning system with a movable error correction element in accordance with the present invention.

FIG. 7 depicts a scanning system 700 which is similar to scanning system 600 of FIG. 6. However, the memory 792 stores encoded signals corresponding to the motion of the lens 580 necessary to correct the misalignment of the beams emitted from the rotating dove prism 516.

The proper motion of the lens can be encoded using, for example, a pair of appropriately mounted reticules 704, light emitter 706 and detector 702. The movement of the correction lens 580 to correct for detected misalignment is sensed by detector 702 prior to writing by detecting light from emitter 706 which passes through the reticules 704 and the sensed movement is encoded and stored in memory 792. The encoded data is then retrieved by the processor and used to drive the proper movement of the corrective lens 580 during writing operations. The stored encoded signals are issued to the lens correction assembly controller 595 at a timing synchronized to the rotation of the dove prism 516.

To further improve the performance of multiple beam scanners with a rotating dove prism, a separate active correction for inaccuracies in synchronization of rotations may also be provided. In this regard, any synchronization errors between the actual rotations, for example differences of encoder counts and phases, can be corrected by actively tilting or rotating the laser source array using solenoids or a galvanometer. The cross-scan spacing and in-scan coordination of the multiple beams are accordingly more tightly held and the banding and jitter artifacts reduced. Since these effects of the synchronization error are also proportional to the number of beams, the practical number of beams and therefore the speed of slow-scan can be greatly increased.

It should be understood that the same effect could be obtained by actively tilting another optical element, e.g., a second dove prism added to the optical path, rather than the source array. However, this is likely to increase the complexity of scanning systems of the type described in FIGS. 3–7. In accordance with the present correction technique, the source array is tilted about an axis generally parallel to the beam direction, or average direction of a fan of beams, at an angle equal to the phase angle error of the two motors and in the direction of the rotation error between the dove prism motor and the spin mirror motor. This causes a compensating rotation of the scanning beams and thereby maintains a fixed orientation of the beams on the imaging surface along the inner-circumference of the drum. Any collimating lenses downstream of the source array are preferably also rotated with the source array to minimize any unwanted motions of the image.

The phase angle of the dove prism motor changes by $4\pi$ radians per revolution while the spin motor changes by $2\pi$ radius per revolution. The phase angle is the angle of rotation of the optical image produced, rather than the mechanical rotation of the motor shafts. More particularly, the image rotation created by any lack of synchronization in the rotations of the spin motors is corrected by dynamically tilting the source array and associated optical components, based on the phase angle error between the motors.

If a linear source array is tilted in the object plane to match the rotation of the imaging surface as seen from the object surface, tracing backwards through the optical system, then the scanning beams will remain at a fixed orientation on the imaging surface and also remain in focus. The tilt or rotation of any associated collimating lens or optics will minimize unwanted displacements or focus shifts of the scanning beams due to the tilt or rotation.

Figure 8:
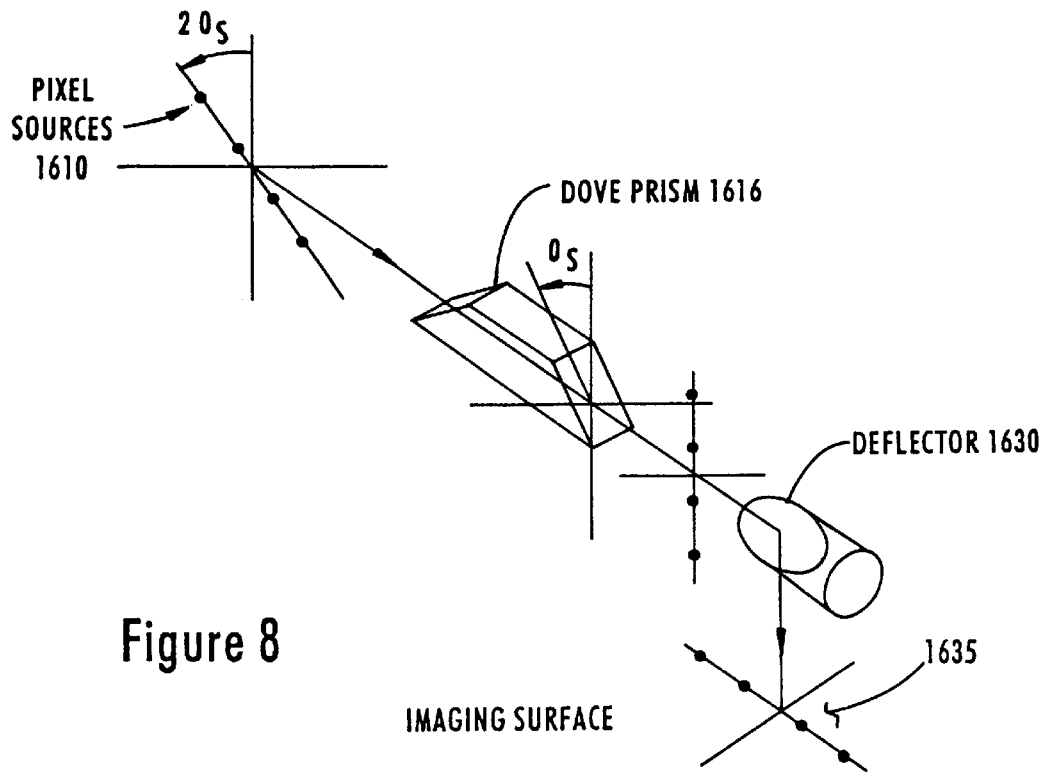
FIG. 8 depicts the tilting of the source array to correct for synchronization errors in any of the above embodiments in accordance with the present invention.

Referring to FIG. 8, if a motor spinning a dove prism drifts out of the correct position relative to the rotation of the motor spinning the deflector by a rotating angle $\theta_s$ of the motor shaft, a phase angle error of $\theta=2\theta_s$ of optical rotation will be produced for the dove prism. The error at the imaging plane can be corrected by tilting the source array by an angle of $\theta=2\theta_s$ in the same direction.

FIG. 8 shows a snapshot of such a correction at the instant that the beams are deflected onto the imaging surface 1635. It will be noted that the angles are exaggerated for clarity. The dove prism 1616 may be at any multiple of 90° of shaft rotation from the position shown, the source 1610 geometry is exemplary. Additional optics located upstream and downstream of the dove prism 1616 are not shown for clarity. The line of pixel sources 1616 may include or be replaced by a source array.

A further technique, which can be used in lieu of the technique described in FIG. 8 to improve the performance of multiple beam scanners having a rotating dove prism, is to electrically correct the most important effects of any inaccuracies in synchronization of the spin motor rotations. As discussed above, any synchronization errors between the actual rotations, including differences in encoder counts and phases, are used as phase error inputs to the phase-lock control loop for the slow-scan motion. The speed of the slow-scan motion can thereby be matched to the actual cross-scan spacing between the multiple beams, despite small changes to the cross-scan spacing caused by the synchronization error. The overlap between successive groups of multiple scan lines can then be more tightly controlled and banding artifacts can be eliminated or reduced.

Synchronization errors between the rotations can be used as appropriately scaled phase error inputs to the phase-lock control loops for the fast-scan source array pixel timing of the individual beams. The pixel timing can thereby adjust the fast-scan pixel positions for the actual individual in-scan beam positions, despite small changes to the in-scan beam positions caused by the synchronization error. The jitter between the last line of one sweep of multiple beams and the first line of the next sweep of multiple beams can thereby be reduced. In those multiple beam geometries where the jitter effect limits the practical number of beams, the speed of the slow-scan can then be greatly increased.

Figure 9:
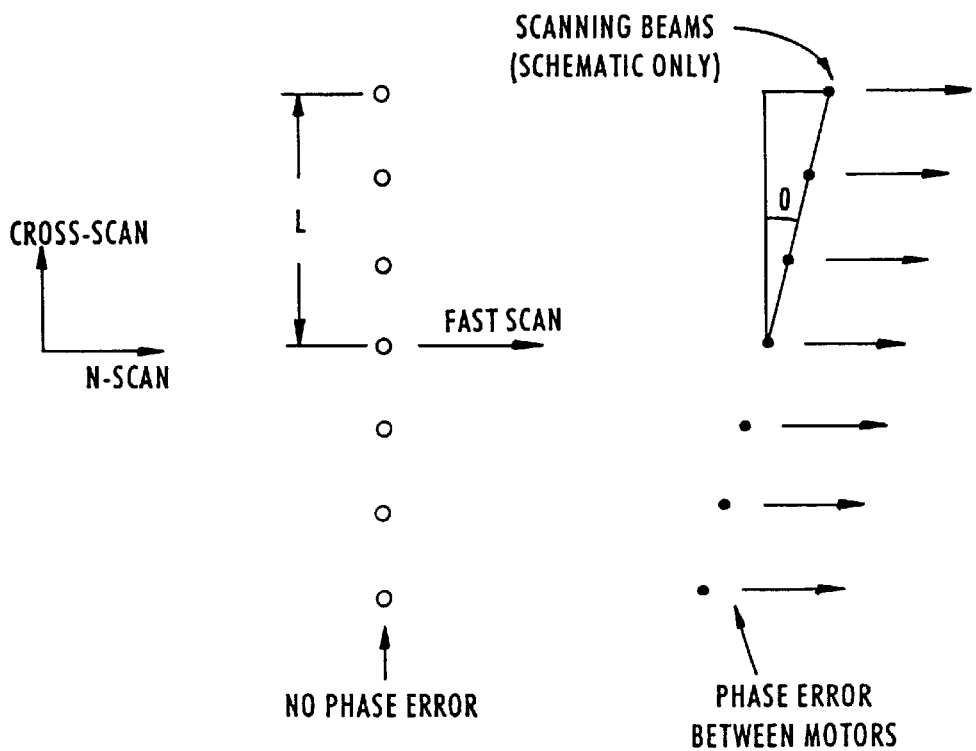
FIG. 9 depicts the control of source array pixel emission timing to correct for synchronization errors in any of the above embodiments in accordance with the present invention.

As shown in FIG. 9, any phase error between the spin motors will produce both a cross-scan error and an in-scan error which grows as the separation between the beams increases and, therefore, as the number of beams increases. For a phase angle of $\theta$ between the motors, the worst case line spacing errors are equal to $(L)(\cos \theta)$ where L is the distance between the first and last beam and the in-scan error is equal to $(L)(\sin \theta)$. The cross-scan error produces twinning of scan lines or banding between successive sweeps of the multiple beam groups of scan lines, but the dependence on the cosine of $\theta$ places only loose requirements on phase angle $\theta$. The in-scan error produces a repetitive line jitter which is generally tolerable in the sense that the artifacts produced are less visible to the naked eye. However, the dependence on the sine of $\theta$ can easily cause excessive errors if the number of beams (i.e. L) is large or the phase angle between the motors cannot be tightly controlled or locked.

By introducing delays to the clocks used to control the in-scan pixel emission timing based on a measurement of the phase angle and proportional to the number of beams in line or distance of each beam from the center of the $\theta$ rotation, the synchronization error can be corrected. Negative delays can be obtained by varying each delay around or on top of an offset delay large enough to handle the largest expected $\theta$. The motor inertias are typically sufficient to prevent large phase errors in a single rotation so the phase error measurement and delay adjustments need be performed only once per revolution of the dove prism and once every two revolutions of the deflector. In this fashion, either the number of beams in a multiple beam cylindrical drum system can be greatly increased, the motor/motor controller requirements can be greatly loosened, and/or higher quality recording can be obtained.

If the overlap of spot size to line spacing requires a tilting of the sources at a large angle to the cross-scan direction, i.e. an $\theta$ nearer 90° than 0°, then the correcting of the motor phase error will be primarily in the cross-scan direction. In this case the cross-scan induced banding can be reduced by using the measured phase error to control the slow-scan motion of the scanning lines, e.g. to control of the carriage motion in an internal drum system to delay or advance the slow-scan motion and prevent the appearance of white lines or dark lines at the interface between the groups at scan lines.

Another technique for reducing the sensitivity to rotational errors is to increase the effective source spot size using apertures or apodizers. Since increasing the spot size at the imaging surface with an aperture does not change the separation of the spots at the drum, the tilt angle required for proper overlap is reduced. This approach is limited by the loss of light through smaller apertures.

Figure 10:
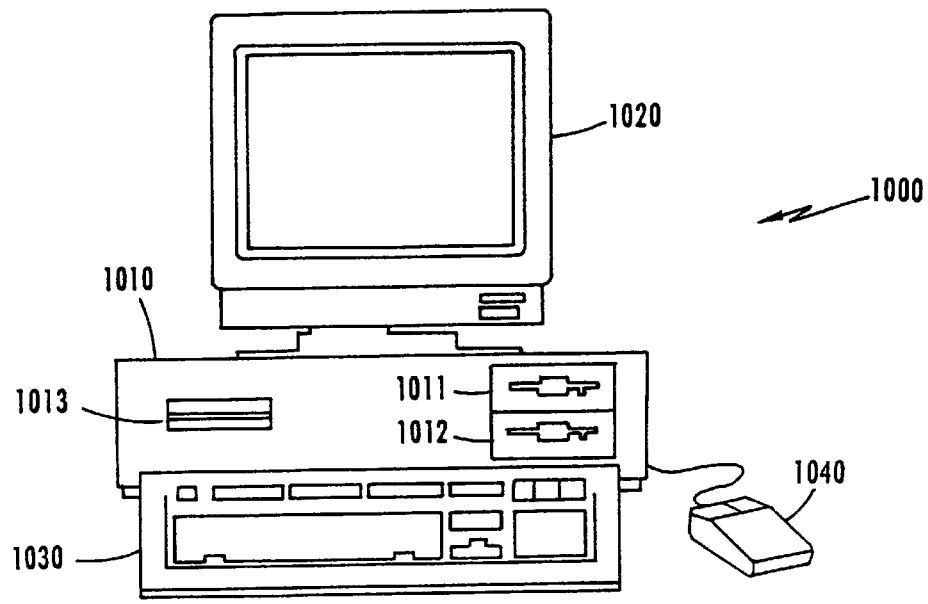
FIG. 10 depicts a computer suitable for use in any of the above embodiments of the invention.
Figure 11:
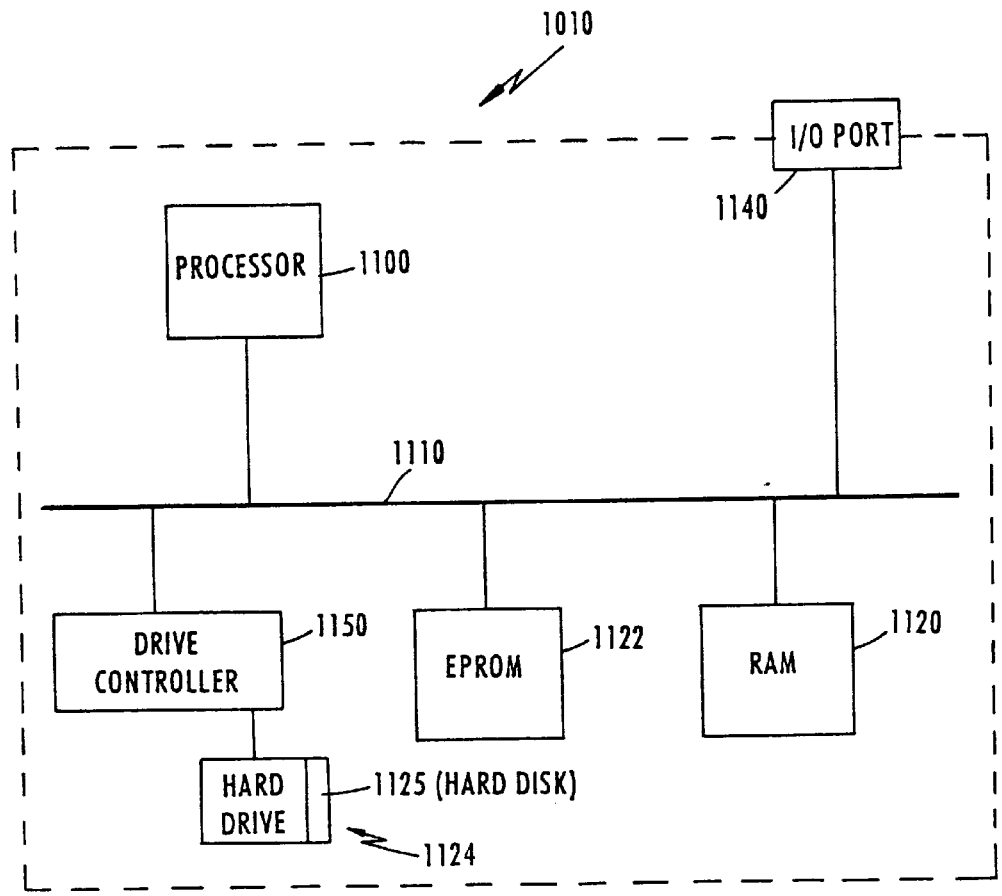
FIG. 11 is an exemplary block diagram of components of the computer depicted in FIG. 10.

FIGS. 10 and 11 depict an exemplary computer suitable for use as the processor in any of the above-described embodiments of the invention. The computer is preferably a commercially available personal computer or high powered work station. The computer processor could, for example, be a pentium processor™. It would be recognized that the computer configuration is exemplary in that other components (not shown) could be added or substituted for those depicted and certain of the depicted components could be eliminated if desired.

The computer processor and memory function as described above with reference to FIGS. 2–7, in accordance with stored programming instructions which drive its operation. Preferably the computer stores its unique programming instructions on the EPROM or hard disk. It should be recognized that only routine programming is required to implement the instructions required to drive the computer to operate in accordance with the invention, as described above. Further, since the computer components and configuration are conventional, routine operations performed by depicted components will generally not be described, such operations being well understood in the art.

Referring to FIG. 10, the computer 1000 includes a main unit 1010 with slots 1011, 1012 and 1013, respectively provided for loading programming or data from a floppy disk and/or compact disc (CD) onto the computer 1000. The computer 1000 also includes a keyboard 1030 and mouse 1040 which serve as user input devices. A monitor display 1020 is also provided to visually communicate information to the user.

As depicted in FIG. 11, the computer 1000 has a main processor 1100 which is interconnected via bus 1110 with various storage devices including RAM 1120, EPROM 1122 and hard drive 1124 which has an associated hard disk 1125, all of which serve as storage media on which computer programming or data can be stored for access by the processor 1100. A drive controller 1150 controls the hard drive 1124. It will be understood that other components may be connected if desired to the bus 1110. Also depicted in FIG. 11 is an I/O port 1140 connected with the bus 1110 for receiving signals from the detectors representing a misalignment of the beams with respect to the spin mirror as described above. By accessing the stored computer programming the processor 1100 is driven to operate in accordance with the present invention.

The interoperation of the various components of the computer depicted in FIGS. 10 and 11 in implementing the invention as described above will now be discussed. Input signals corresponding to those issued from the detectors are received via I/O port 1140 and transmitted to processor 1100 via bus 1110. The processor in accordance with programming instructions stored on EPROM 1122 processes the received data to identify a misalignment in the emitted beams with respect to the spin mirror and generates correction signals responsive to which a controller will control the driving of the correction lens to correct for the misalignment. The programming instructions may be downloaded onto the RAM upon activation of the computer 1000 and accessed by the processor 1100 directly from the RAM 1120 during system operation.

The correction signals may be immediately transmitted via the bus 1110 and I/O port 1140 to the correction lens assembly controller to provide real time detection and correction of the misalignment as described above in the embodiments of FIGS. 2–5. Alternatively, the correction signals may be transmitted via the bus 1110 to the hard drive controller 1150 for storage by the hard drive 1124 on hard disk 1125. The hard disk 1125 serves as the memory storage described in connection with the embodiments of FIGS. 6 and 7. As has been previously described, in this latter case, misalignment detection and generation of the correction signals is performed prior to writing on the imaging surface, i.e. not in real time. The correction signals can be retrieved from the hard disk 1125 by the processor 1100 during writing operations in accordance with the stored programming instructions. It will be understood that if desired the stored correction signals may be downloaded to the RAM 1120 upon activation of the computer 1000 and accessed from the RAM 1120 in accordance with the stored programming instructions by the processor 1100 for outputting via I/O port 1140 to the correction assembly controller. In this manner the processor 1100 in accordance with the stored programming instructions identifies the misalignments and generates and issues correction signals to the correction assembly controller responsive to which the controller issues signals to the correction assembly driver to drive the lens and thereby correct the misalignment of the writing beams.

As described above, a simplified scanning system is provided which corrects synchronization errors resulting from wobble or misalignment of the dove prism to thereby improve multibeam image recording. The system advantageously passes multiple beams along a single optical path through a single correction device to simultaneously correct positioning errors in all the beams. Beneficially, the system may be configured to detect beam positioning errors without requiring that a portion of the light beam(s) be used during recording operations to detect such errors.

It will also be recognized by those skilled in the art that, while the invention has been described above in terms of preferred embodiments it is not limited thereto. Various features and aspects of the above described invention may be used individually or jointly. Further, although the invention has been described in the context of its implementation in a particular environment and for particular applications, e.g. electronic prepress applications, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

We claim:

1. A scanning system for scanning an imaging surface, comprising:

a radiation emitter configured to emit a beam of radiation;

a deflector configured to scan the beam across said imaging surface;

a movable correction element having a beam axis, disposed between said emitter and said imaging surface and movable substantially perpendicular to said axis; and a driver configured to move said correction element in synchronization with the scanning of said beam to correct a misalignment of the beam with respect to the imaging surface.

2. A scanning system according to claim 1, wherein the deflector is a spinning deflector.

3. A scanning system according to claim 1, further comprising a detector configured to detect the misalignment of the beam with respect to the imaging surface.

4. A scanning system according to claim 3, wherein said detector includes at least one of a quadrature photodetector, a linear photodetector or a pair of reticules operative in cooperation with a detection device.

5. A scanning system according to claim 1, wherein said driver moves said correction element such that said correction element moves during imaging to modify the direction of said emitted beam so as to be in alignment with said imaging surface.

6. A scanning system according to claim 1, further comprising a detector configured to detect the misalignment of the beam prior to writing on the imaging surface.

7. A scanning system according to claim 1, wherein said driver is configured to drive pre-writing movement of said correction element prior to writing on the imaging surface to correct the detected misalignment and further comprising:

a first detector configured to detect the misalignment of the light beam prior to writing on the imaging surface;

a second detector for detecting the pre-writing movement of the correction element; and an encoder for encoding the detected pre-writing movement of the correction element;

wherein said driver is further configured to move said correction element during the writing on said imaging surface in accordance with said encoded movement to correct for the detected misalignment.

8. A scanning system according to claim 1, further comprising a detector configured to detect the misalignment of the emitted beam with respect to the imaging surface and a second radiation emitter configured to emit a reference beam of radiation, wherein said correction element is disposed between said second emitter and said detector, and said detector is configured to detect light from said reference beam to thereby detect a misalignment of the other beam with respect to said deflector.

9. A scanning system according to claim 8, wherein the reference beam has a modulation frequency different from a frequency of the other beam.

10. A scanning system according to claim 8, wherein the reference beam has a wavelength different from a wavelength of the other beam.

11. A scanning system according to claim 1, wherein: said deflector is a spin deflector configured to spin about an axis of rotation; and said driver is configured to move said correction element to modify the direction of said emitted beam so as to impinge upon the spin deflector at a location relative to the axis of rotation of the spin deflector.

12. A scanning system according to claim 11, wherein the location is coincident with the axis of rotation.

13. A scanning system according to claim 1, further comprising a spin element disposed in the path of the emitted beam, wherein:

said emitter includes a radiation source array;

said deflector is a spin deflector configured to rotate to thereby scan the emitted beam during scanning of the imaging surface; and said source array is tilted to correct for a synchronization error between rotation of the spin element and rotation of said spin deflector during scanning of the imaging surface.

14. A scanning system according to claim 1, further comprising a spin element disposed in the path of the emitted beam, wherein:
   said emitter includes a radiation source array having a plurality of pixels;
   said deflector is a spin deflector configured to rotate to thereby scan the emitted beam during scanning of the imaging surface; and
   timing of radiation emissions from respective pixels with said plurality of pixels is controllable to correct for synchronization error between rotation of said spin element and rotation of said spin deflection during scanning of the imaging surface.

15. The scanning system of claim 1, wherein said moveable correction element is moveable along a first ray and a second ray, an angle between the first ray and the second ray being other than 180°.

16. A scanning system for scanning an imaging surface, comprising:
   at least one radiation emitter configured to emit at least a first beam of radiation and a second beam of radiation;
   a deflector configured to direct the first beam to form a first scan line and the second beam to form a second scan line on said imaging surface;
   a movable correction element, having a beam axis, disposed between said at least one emitter and said deflector and movable substantially perpendicular to said axis; and
   a driver configured to continuously move said correction element during the scanning of said imaging surface to correct a misalignment of said beams with respect to said deflector.

17. A scanning system according to claim 16, wherein said deflector is a spin deflector which is rotatable about a spin axis to form said first and said second scan lines, and further comprising:
   a spin element, disposed in the path of the beams, configured to rotate in synchronization with rotation of said spin deflector such that the first scan line and the second scan line are non-intersecting; and
   a detector configured to detect a misalignment of at least one of the beams with respect to said spinning deflector.

18. A scanning system according to claim 17, wherein said spin element is configured to rotate about an axis and said detector is configured to detect misalignment of said at least one beam after passing through said spin element and said misalignment is caused by said beam passing through said spin element.

19. A scanning system according to claim 17, wherein said detector includes a quadrature photodetector.

20. A scanning system according to claim 17, wherein said detector includes a pair of reticules operative in cooperation with a second detector.

21. A scanning system according to claim 17, wherein:
   said spinning element rotates about an axis; and
   said driver is configured to move said correction element in synchronization with the rotation of said spinning element, so as to modify the direction of said beams to be in alignment with a location relative to the spin axis of the spin deflector.

22. A scanning system according to claim 16, further comprising a detector configured to detect the misalignment of at least one of said beams prior to writing on the imaging surface.

23. A scanning system according to claim 16, further comprising a detector configured to detect the misalignment of at least one of said beams prior to writing on the imaging surface and said driver is configured to cause pre-writing movement of said correction element prior to writing on the imaging surface to correct the detected misalignment and further comprising:
   a second detector for detecting the pre-writing movement of the correction element;
   an encoder for encoding the detected pre-writing movement of the correction element;
   wherein said driver is further configured to move said correction element during writing on said imaging surface in accordance with said encoded movement to correct the detected misalignment.

24. A scanning system according to claim 16, further comprising:
   a reference emitter configured to emit a reference beam of radiation; and
   a detector configured to detect said reference beam to thereby identify a misalignment of the first and the second beams with respect to said imaging surface;
   wherein said correction element is disposed between said emitters and said detector.

25. A scanning system according to claim 24, wherein said reference beam has a modulation frequency different from a frequency of said first and said second beams.

26. A scanning system according to claim 24, wherein said reference beam has a wavelength different from a wavelength of said first and said second beams.

27. A scanning system according to claim 24, further comprising:
   a detector configured to detect said reference beam to thereby identify a misalignment of said first and said second beams with respect to the imaging surface;
   a beam combiner disposed between said emitters and said correction element for combining said first and said second light beams with said reference light beam;
   a beam splitter disposed between said correction element and said deflector for splitting said combined beams;
   a first filter disposed between said beam splitter and said deflector for filtering said reference beam from said combined beams; and
   a second filter disposed between said beam splitter and said detector for filtering said first and said second beams from said combined beams.

28. A scanning system according to claim 16, wherein:
   said deflector is a spin deflector configured to rotate about an axis of rotation; and
   said driver is configured to move said correction element to modify the direction of said beams such that one of said beams impinges upon the spin deflector at a fixed location relative to the axis of rotation of the spin deflector.

29. A scanning system according to claim 28, wherein said location is coincident with an axis of rotation of the spin deflector.

30. A scanning system according to claim 16, further comprising a spin element disposed in the path of the emitted beams, wherein:
   said at least one emitter includes a radiation source array;
   said deflector is a spin deflector configured to rotate to thereby scan the emitted beams during scanning of the imaging surface; and
   said source array is tilted to correct for a synchronization error between rotation of the spin element and rotation of said spin deflector during scanning of the imaging surface.

31. A scanning system according to claim 16, further comprising a spin element disposed in the path of the emitted beams, wherein:

said at least one emitter includes a radiation source array having a plurality of pixels;

said deflector is a spin deflector configured to rotate to thereby scan the emitted beam during scanning of the imaging surface; and timing of radiation emissions from respective pixels with said plurality of pixels is controllable to correct for synchronization error between rotation of said spin element and rotation of said spin deflection during scanning of the imaging surface.

32. The scanning system of claim 16, wherein said moveable correction element is moveable along a first ray and a second ray, an angle between the first ray and the second ray being other than 180°.

33. A method of scanning an imaging surface, comprising the steps of:

emitting a beam of radiation;

scanning the beam across said imaging surface;

detecting a misalignment of the beam with respect to said imaging surface; and moving a correction element substantially perpendicular to a beam axis thereof in synchronization with scanning of said beam to correct the detected misalignment.

34. A scanning method according to claim 33, wherein said correction element is moved in a cyclic fashion during scanning of the imaging surface to modify a direction of said beam so as to be in alignment with said imaging surface.

35. A scanning method according to claim 33, wherein said detecting step is performed prior to writing on the imaging surface.

36. A scanning method according to claim 33, further comprising the steps of:

driving pre-writing movement of said correction element prior to writing on the imaging surface to correct the detected misalignment;

detecting the pre-writing movement of the correction element;

encoding the detected pre-writing movement of the correction element; and wherein said detecting step is performed prior to writing on the imaging surface and said step of moving the correction element during the scanning of said imaging surface is performed in accordance with said encoded movement to correct for the detected misalignment.

37. A scanning method according to claim 33, further comprising the step of:

emitting a reference beam of radiation; and passing the reference beam through the correction element;

wherein said detecting step includes detecting said reference beam to thereby detect a misalignment of the other of said beams with respect to said imaging surface.

38. A scanning method according to claim 37, wherein said reference beam has a modulation frequency which is different than a frequency of the other beam.

39. A scanning method according to claim 37, wherein said reference beam has a wavelength which is different than a wavelength of the other beam.

40. A scanning method according to claim 33, wherein:

said directing of the beam is performed by spinning a deflector configured to rotate about an axis of rotation; and the movement of said correction element modifies the direction of said beam so as to impinge upon the spin deflector at a location relative to the axis of rotation thereof.

41. A scanning method according to claim 40, wherein said location is coincident with the axis of rotation.

42. The method of claim 33, when said correction element is moveable along a first ray and a second ray, an angle between the first ray and the second ray being other than 180°.

43. A method of scanning an imaging surface, comprising the steps of:

emitting a plurality of beams of radiation;

directing the plurality of beams from a deflector to form a plurality of scan lines on said imaging surface;

detecting a misalignment of the plurality of beams with respect to said imaging surface; and continuously moving a correction element having a beam axis, substantially perpendicular to said axis during the scanning of said imaging surface to correct for the detected misalignment.

44. A scanning method according to claim 43, further comprising the step of rotating a spin element disposed in the path of the plurality of beams in synchronization with rotation of said deflector such that the plurality of scan lines are non-intersecting.

45. A scanning method according to claim 44, wherein said spin element is rotated about a spin axis and said detected misalignment occurs as a result of said plurality of beams passing through said spin element.

46. A scanning method according to claim 44, wherein:

said spin element is spun about a spin axis; and the movement of said correction element is synchronized with the rotation of the spin element to modify the direction of said plurality of beams so as to be in alignment with said imaging surface.

47. A scanning method according to claim 43, wherein said step of detecting is performed prior to writing on the imaging surface.

48. A scanning method according to claim 43, further comprising the steps of:

driving pre-imaging movement of said correction element prior to writing on the imaging surface to correct the detected misalignment;

detecting the pre-writing movement of the correction element; and encoding the detected pre-writing movement of the correction element;

wherein said step of detecting is performed prior to writing on the image surface and the movement of said correction element during the scanning of said imaging surface is performed in accordance with said encoded movement to correct for the detected misalignment.

49. A scanning method according to claim 43, further comprising the steps of:

emitting a reference beam of radiation; and directing the reference beam through the correcting element;

wherein, the step of detecting includes detecting said reference beam to identify a misalignment of the plurality of beams with respect to said imaging surface.

50. A scanning method according to claim 49, wherein said reference beam has a modulation frequency different from a frequency of the first beam and a frequency of the second beam.

51. A scanning method according to claim 49, wherein said reference beam has a wavelength different from a wavelength of the first beam and a wavelength of the second beam.

52. A scanning method according to claim 49, further comprising the steps of:
combining said plurality of beams with said reference beam upstream of the correction element;
splitting said combined beams downstream of the correction element;
filtering said reference beam from said combined beams downstream of the correction element; and
filtering said plurality of beams from said combined beams downstream of the correction lens.

53. A scanning method according to claim 43, wherein:
said deflector is rotated about a spin axis; and
the movement of said correction element modifies the direction of said plurality of beams such that said plurality of beams impinge upon the deflector at respective locations relative to the spin axis.

54. A scanning method according to claim 53, wherein one of the plurality of beams impinge upon the deflector substantially coincident with the spin axis.

55. The method of claim 43, wherein said correction element is moveable along a first ray and a second ray, an angle between the first ray and the second ray being other than 180°.

56. A scanning system for scanning an imaging surface, comprising:
a cylindrical drum having a curved imaging surface disposed therein;
at least one radiation emitter configured to emit a first beam of radiation and a second beam of radiation;
a spin deflector, disposed within said drum, configured to rotate and thereby direct the first beam to form a first scan line and the second beam to form a second scan line on said curved imaging surface;
a spin element, having a spin axis, disposed between said at least one emitter and said spin deflector and in a path of the beams, configured to rotate in relationship with the rotation of said spin deflector such that the first scan line and the second scan line are non-intersecting;
a cyclically movable correction element, having a beam axis, disposed between said spin element and said spin deflector;
a detector disposed downstream of said correction element and configured to detect radiation to thereby identify a misalignment of the beams with respect to said imaging surface; and
a driver configured to move said correction element in synchronization with the rotation of said spin element during the scanning of said imaging surface to correct the identified misalignment.

57. A scanning system according to claim 56, further comprising:
a reference radiation emitter disposed upstream of said spin element and configured to emit a reference beam of radiation;
a beam combiner disposed between said emitters and said correction element for combining said first and said second beams with said reference beam;
a beam splitter disposed between said correction element and said spin deflector for splitting said combined beams;
a first filter disposed between said beam splitter and said spin deflector for filtering said reference beam from said combined beams; and
a second filter disposed between said beam splitter and said detector for filtering said first and said second beams from said combined beams;
wherein said detector is configured to detect only radiation from said reference beam to identify the misalignment of the first and the second beams with respect to said spin deflector.

* * * * *